United States Patent
Weiss et al.

(10) Patent No.: US 11,531,777 B2
(45) Date of Patent: Dec. 20, 2022

(54) METHODS AND SYSTEMS FOR RESTRICTING DATA ACCESS BASED ON PROPERTIES OF AT LEAST ONE OF A PROCESS AND A MACHINE EXECUTING THE PROCESS

(71) Applicant: Virtru Corporation, Washington, DC (US)

(72) Inventors: Rebecca Claire Weiss, Vienna, VA (US); Reuven Mark Vallejo Gonzales, Pasadena, CA (US); William Rodgers Ackerly, Washington, DC (US)

(73) Assignee: Virtru Corporation, Washington, DC (US)

( * ) Notice: Subject to any disclaimer, the term of this patent is extended or adjusted under 35 U.S.C. 154(b) by 85 days.

(21) Appl. No.: 16/750,950

(22) Filed: Jan. 23, 2020

(65) Prior Publication Data
US 2020/0242267 A1 Jul. 30, 2020

Related U.S. Application Data

(60) Provisional application No. 62/798,773, filed on Jan. 30, 2019.

(51) Int. Cl.
*G06F 21/62* (2013.01)
*H04L 9/32* (2006.01)
(Continued)

(52) U.S. Cl.
CPC .......... *G06F 21/6218* (2013.01); *H04L 9/083* (2013.01); *H04L 9/321* (2013.01); *H04L 63/08* (2013.01); *H04L 63/102* (2013.01)

(58) Field of Classification Search
CPC ..... G06F 21/6218; H04L 9/083; H04L 9/321; H04L 63/08; H04L 63/102
See application file for complete search history.

(56) References Cited

U.S. PATENT DOCUMENTS 7,774,411 B2  8/2010 Lemay
7,844,832 B2  11/2010 Nation
(Continued)

FOREIGN PATENT DOCUMENTS

CA  2821916 C  11/2018
EP  1903467 A2  3/2008
(Continued)

OTHER PUBLICATIONS

Extended European Search Report dated Oct. 26, 2020, in European patent application 20190358.0, 7 pages.
(Continued)

*Primary Examiner* — Jason Chiang
(74) *Attorney, Agent, or Firm* — Blueshift IP, LLC; Cynthia M. Gilbert

(57) ABSTRACT

A method of restricting data access based on properties of at least one of a process and a machine executing the process includes receiving, by an access control management system, from a first computing device, information associated with an encrypted data object. The method includes requesting, by the access control management system, from a verifier, verification that a second computing device executes a process in accordance with a process attribute identified in the information associated with the encrypted data object. The method includes sending, by the access control management system, to the second computing device, the received information associated with the encrypted data object, responsive to the verification of the process attribute.

13 Claims, 8 Drawing Sheets

(51) Int. Cl.
  *H04L 9/08* (2006.01)
  *H04L 9/40* (2022.01)

(56) References Cited

U.S. PATENT DOCUMENTS

| | | | |
|---|---|---|---|
| 7,913,311 B2 | 3/2011 | Alain | |
| 7,921,288 B1 | 4/2011 | Hildebrand | |
| 7,921,450 B1 | 4/2011 | Vainstein | |
| 8,909,928 B2* | 12/2014 | Ahmad | H04L 9/0897 713/168 |
| 9,083,529 B1 | 7/2015 | Statica | |
| 9,111,079 B2* | 8/2015 | Neystadt | H04L 63/10 |
| 9,503,452 B1* | 11/2016 | Kumar | H04L 63/0838 |
| 9,807,031 B2* | 10/2017 | Haris | H04L 49/00 |
| 9,866,533 B2 | 1/2018 | Chazalet et al. | |
| 9,942,083 B1* | 4/2018 | Adogla | G06F 9/45533 |
| 10,067,940 B2* | 9/2018 | Chhaunker | G06F 9/5072 |
| 10,108,465 B1* | 10/2018 | Gaudlip | G06F 9/45558 |
| 10,142,320 B2* | 11/2018 | Coxe | G06F 21/31 |
| 10,277,649 B2* | 4/2019 | Threlkeld | H04L 65/4076 |
| 10,284,487 B2* | 5/2019 | El-Charif | H04L 67/1012 |
| 10,366,358 B1* | 7/2019 | Roth | G06Q 10/06316 |
| 10,404,476 B1* | 9/2019 | Jackson | H04L 63/0428 |
| 10,523,646 B2* | 12/2019 | Ackerly | H04L 63/0428 |
| 10,826,881 B2* | 11/2020 | Broussard | H04W 4/02 |
| 11,044,239 B2 | 6/2021 | Ackerly | |
| 11,196,729 B2 | 12/2021 | Ackerly | |
| 2002/0049679 A1 | 4/2002 | Russell | |
| 2002/0091782 A1 | 7/2002 | Benninghoff | |
| 2003/0061481 A1 | 3/2003 | Levine et al. | |
| 2003/0149781 A1 | 8/2003 | Yared | |
| 2004/0034776 A1 | 2/2004 | Fernando | |
| 2004/0186997 A1 | 9/2004 | Todaka | |
| 2005/0187966 A1 | 8/2005 | Iino | |
| 2006/0005000 A1 | 1/2006 | King | |
| 2007/0043680 A1 | 2/2007 | Fox | |
| 2007/0074270 A1 | 3/2007 | Meehan | |
| 2007/0118735 A1 | 5/2007 | Cherrington | |
| 2008/0005024 A1 | 1/2008 | Kirkwood | |
| 2008/0086646 A1 | 4/2008 | Pizano | |
| 2008/0151110 A1 | 6/2008 | Hasegawa | |
| 2008/0307530 A1 | 12/2008 | Lee | |
| 2008/0313699 A1 | 12/2008 | Starostin | |
| 2009/0055924 A1 | 2/2009 | Trotter | |
| 2009/0086646 A1 | 4/2009 | Kuchibhotla | |
| 2009/0106549 A1 | 4/2009 | Mohamed | |
| 2009/0106788 A1 | 4/2009 | Nochimowski | |
| 2010/0153739 A1 | 6/2010 | Guymon, Jr. | |
| 2010/0199105 A1 | 8/2010 | Lee | |
| 2011/0022642 A1* | 1/2011 | deMilo | G06F 16/122 707/805 |
| 2011/0040964 A1 | 2/2011 | Nussbaum | |
| 2011/0040967 A1 | 2/2011 | Waller | |
| 2012/0179905 A1 | 7/2012 | Ackerly | |
| 2013/0007891 A1* | 1/2013 | Mogaki | G06F 21/6218 726/27 |
| 2013/0060945 A1* | 3/2013 | Allam | G06F 9/455 709/226 |
| 2013/0097680 A1* | 4/2013 | Bendapudi | G06F 21/335 709/213 |
| 2013/0311778 A1* | 11/2013 | Cherukuri | H04L 63/0272 713/171 |
| 2014/0068340 A1* | 3/2014 | Dayal | H04L 41/5096 714/38.1 |
| 2014/0089658 A1 | 3/2014 | Raghuram | |
| 2014/0096182 A1* | 4/2014 | Smith | H04L 63/061 726/1 |
| 2014/0108784 A1* | 4/2014 | Pendarakis | H04L 9/3263 713/175 |
| 2014/0122873 A1* | 5/2014 | Deutsch | H04L 63/0884 713/158 |
| 2014/0207918 A1* | 7/2014 | Kowalski | H04L 41/0803 709/220 |
| 2015/0163158 A1* | 6/2015 | Ryland | H04L 45/00 709/225 |
| 2016/0044132 A1* | 2/2016 | Croft | H04L 67/306 709/225 |
| 2016/0308852 A1* | 10/2016 | Coxe | G06F 21/31 |
| 2016/0366185 A1* | 12/2016 | Lee | G06F 9/45558 |
| 2017/0063816 A1* | 3/2017 | Ackerly | H04L 63/0428 |
| 2017/0109815 A1* | 4/2017 | Bai | G06Q 30/08 |
| 2017/0212736 A1* | 7/2017 | Maya | G06F 8/24 |
| 2017/0222878 A1* | 8/2017 | Jacquin | H04L 41/0893 |
| 2018/0084081 A1* | 3/2018 | Kuchibhotla | H04L 47/826 |
| 2018/0300740 A1* | 10/2018 | Chandrashekar | G06Q 30/0206 |
| 2018/0316552 A1* | 11/2018 | Subramani Nadar | G06F 8/65 |
| 2018/0367528 A1* | 12/2018 | Schwarz | H04L 9/0894 |
| 2019/0065278 A1* | 2/2019 | Jeuk | G06F 9/455 |
| 2019/0141119 A1* | 5/2019 | Bernat | H04L 41/5006 |
| 2019/0212995 A1* | 7/2019 | Hwang | G06F 11/008 |
| 2019/0341783 A1* | 11/2019 | Kosugi | G01R 31/367 |
| 2020/0092270 A1 | 3/2020 | Ackerly | |
| 2020/0242267 A1* | 7/2020 | Weiss | H04L 63/0428 |
| 2020/0287890 A1* | 9/2020 | Edgington | H04L 9/3066 |
| 2021/0273930 A1 | 9/2021 | Ackerly | |
| 2022/0060457 A1 | 2/2022 | Ackerly | |

FOREIGN PATENT DOCUMENTS

| | | |
|---|---|---|
| EP | 3754532 A1 | 12/2020 |
| WO | 2008100264 A2 | 8/2008 |
| WO | 2008100264 A3 | 7/2009 |

OTHER PUBLICATIONS

Notice of Allowance dated Feb. 23, 2021, in U.S. Appl. No. 16/689,113, 19 pages.

Notice of Allowance dated Aug. 3, 2021, in U.S. Appl. No. 17/324,339, 26 pages.

U.S. Appl. No. 14/064,247, filed Oct. 28, 2013.

Advisory Action in U.S. Appl. No. 13/340,732 dated Sep. 9, 2013, 3 pages.

Communication pursuant to Article 94(3) EPC, dated Jul. 12, 2019, in European Patent Application No. 17187647.7, 4 pages.

Communication under Rule 71(3) EPC Intention to Grant in European Patent Office Application No. 11855869.1, dated Jul. 7, 2015, 5 pages.

Communication under Rule 71(3) EPC Intention to Grant in European Patent Office Application No. 15191773.9, dated Apr. 28, 2017, 5 pages.

Erol Koc, et al., "PACISSO: P2P Access Control Incorporating Scalability and Self-Organization for Storage Systems," SMLI TR-2007-154, Sun Microsystems, Jun. 2007.

European Search Report dated Nov. 29, 2017 in European patent application No. 17187647.7.

Examination Report No. 1 in Australian Patent Application No. 2016201462, dated Dec. 13, 2016, 2 pages.

Examination Report No. 1 dated Sep. 10, 2018 in Australian patent application 2017219140.

Examination Report No. 2 in Australian Patent Application No. 2017219140, dated Apr. 1, 2019, 7 pages.

Extended European Search Report and Written Opinion for 11855869. 1, dated Aug. 20, 2014, 6 pages.

Extended European Search Report and Written Opinion for Application No. 15191773.9, dated Apr. 8, 2016, 14 pages.

Final Office Action dated Dec. 20, 2018 in U.S. Appl. No. 15/238,752, 7 pages.

Final Rejection in U.S. Appl. No. 13/340,732 dated Jun. 27, 2013, 21 pages.

First Examination Report in Canadian Patent Application No. 2821916, dated Aug. 4, 2017, 5 pages.

First Examination Report, dated May 8, 2019, in Indian Patent Application No. 1198/MUMNP/2013, 6 pages.

International Preliminary Report on Patentability for PCT/US2011/ 068019, dated Jul. 16, 2013, 5 pages.

International Search Report and Written Opinion for PCT/US2011/ 068019, dated Aug. 30, 2012, 9 pages.

(56) References Cited

OTHER PUBLICATIONS

Nobelis et al., "Decentralized Access Right Management for Workflow Applications," 2005, https://nyx.unice.fr/publis/nobelis-boudaoud-etal:2005.pdf.
Non-Final Office Action dated Jul. 11, 2018 in U.S. Appl. No. 15/238,752.
Non-Final Rejection for U.S. Appl. No. 14/949,087, dated Jun. 9, 2016, 20 pages.
Non-Final Rejection for U.S. Appl. No. 14/489,604, dated Apr. 16, 2015, 9 pages.
Non-Final Rejection in U.S. Appl. No. 13/340,732 dated Feb. 1, 2013, 26 pages.
Non-Final Rejection dated May 3, 2019 in U.S. Appl. No. 15/238,752, 17 pages.
Notice of Acceptance in Australian Patent Application No. 2016201462, dated Jun. 13, 2017, 3 pages.
Notice of Allowance for U.S. Appl. No. 14/489,604, dated Sep. 1, 2015, 8 pages.
Notice of Allowance in Canadian Patent Application No. 2821916, dated Jun. 11, 2018, 1 page.
Notice of Allowance in U.S. Appl. No. 14/949,087, dated Oct. 27, 2016, 10 pages.
Notice of Allowance in U.S. Appl. No. 13/340,732 dated Sep. 27, 2013, 17 pages.
Notice of Allowance dated Aug. 27, 2019 in U.S. Appl. No. 15/238,752, 11 pages.
Notice of Allowance dated Jun. 18, 2014 in U.S. Appl. No. 14/064,274, 13 pages.
Notification of Allowance of Amendment to Specification in Australian Patent Application No. 2011354630, dated Mar. 10, 2016, 1 page.
Partial European Search Report for 15191773.9 dated Feb. 15, 2016, 7 pages.
Patent Examination Report No. 1 in Australian Patent Application No. 2011354630, dated Sep. 3, 2015, 21 pages.
Ravi Sandhu et al., "Peer-to-Peer Access Control Architecture using Trusted Computing Technology," ACM, SACMAT'05, Jun. 1-3, 2005, Stockholm, Sweden, 2005.
Final Rejection dated Aug. 13, 2020, in U.S. Appl. No. 16/689,113, 24 pages.
Communication pursuant to Article 94(3) EPC dated May 23, 2022, in European patent application No. 20190358.0, 5 pages.
Hearing Notice dated Feb. 16, 2022, in Indian Patent Application No. 1198/MUMNP/2013, 3 pages.
U.S. Appl. No. 13/340,732, filed Dec. 30, 2011.
U.S. Appl. No. 14/064,274, filed Oct. 28, 2013.
U.S. Appl. No. 14/489,604, filed Sep. 18, 2014.
U.S. Appl. No. 14/949,087, filed Nov. 23, 2015.
U.S. Appl. No. 15/238,752, filed Aug. 17, 2016.
U.S. Appl. No. 16/689,113, filed Nov. 20, 2019.
U.S. Appl. No. 17/324,339, filed May 19, 2021.
U.S. Appl. No. 17/516,334, filed Nov. 1, 2021.

\* cited by examiner

METHODS AND SYSTEMS FOR RESTRICTING DATA ACCESS BASED ON PROPERTIES OF AT LEAST ONE OF A PROCESS AND A MACHINE EXECUTING THE PROCESS

CROSS-REFERENCE TO RELATED APPLICATIONS

This application claims priority from U.S. Provisional Patent Application Ser. No. 62/798,773, filed on Jan. 30, 2019, entitled "Methods and Systems for Restricting Data Access Based on Properties of At Least One of a Process and a Machine Executing the Process," which is hereby incorporated by reference.

BACKGROUND

The disclosure relates to distributing controlled cryptographic data. More particularly, the methods and systems described herein relate to restricting data access based on properties of at least one of a process and a machine executing the process and to secure distribution, in a multi-tenant, high-availability remote computing environment, of data.

Typically, digital rights management systems authenticate user identity in determining whether to allow a user to access data. However, in some instances, a data user may also or alternatively be concerned with a type of computing environment from which a user accesses the data. As one example, in multi-party agreements to share data, parties to the agreement may have requirements regarding the security of the hardware storing the shared data or of processes executing on the hardware and accessing the shared data. Although some systems use agreed upon specifications to determine not to authenticate individual users of a machine, such systems do not typically involve independent verification of the hardware or software itself or without the installation of specialized hardware.

Another challenge faced in implementing digital rights management arises when data owners seek to leverage multi-tenant storage systems. Conventional systems for protecting data stored in multi-tenant systems under the control of a third-party storage provider typically require a level of trust in the third-party storage provider or that the data owner implement cryptographic solutions for securing the data prior to or after distribution of the data to the third-party storage provider. For example, conventional systems may require that a data owner trust that the third-party provider will secure the data or provide a secure mechanism for encrypting the data (e.g., providing an encryption system as well as a storage system), or that the data owner encrypt the data herself and then provide encrypted data to the third-party storage provider, or that the data forego the benefits (including lower costs) of a multi-tenant storage system.

It would be desirable to provide a system that provides functionality for allowing data owners to implement their own cryptographic solutions on a third-party storage provider and for distributing cryptographic data across third-party, multi-tenant systems, according to a method that does not require the data owner to either locally manage (e.g., outside of the third-party, multi-tenant systems) cryptographic data distribution or to trust a cryptographic solution provided by a third-party storage provider.

BRIEF SUMMARY

In one aspect, a method of restricting data access based on properties of at least one of a process and a machine executing the process includes receiving, by an access control management system, from a first computing device, information associated with an encrypted data object. The method includes requesting, by the access control management system, from a verifier, verification that a second computing device executes a process in accordance with a process attribute identified in the information associated with the encrypted data object. The method includes sending, by the access control management system, to the second computing device, the received information associated with the encrypted data object, responsive to the verification of the process attribute.

BRIEF DESCRIPTION OF THE DRAWINGS

Certain objects, aspects, features, and advantages of the disclosure will become more apparent and better understood by referring to the following description taken in conjunction with the accompanying drawings, in which.

DETAILED DESCRIPTION

In one embodiment, the methods and systems described herein provide functionality allowing a data owner to specify attributes required of processes or of machines that may access a data object regardless of whether the processes or machines are owned by the data owner, without having to trust a third-party storage provider. In some embodiments, the methods and systems described herein provide functionality for access control strong enough to process data of a first entity on a device of a second entity and processing data owned by other entities, which may or may not be known or trusted by the first entity. In other embodiments, the methods and systems described herein provide functionality for not just validating not just the hardware and software on a first device to which a first entity entrusts its data but also for validating hardware and software on devices trusted by the first device, which may provide improved functionality for building a high-availability service.

Figure 1:
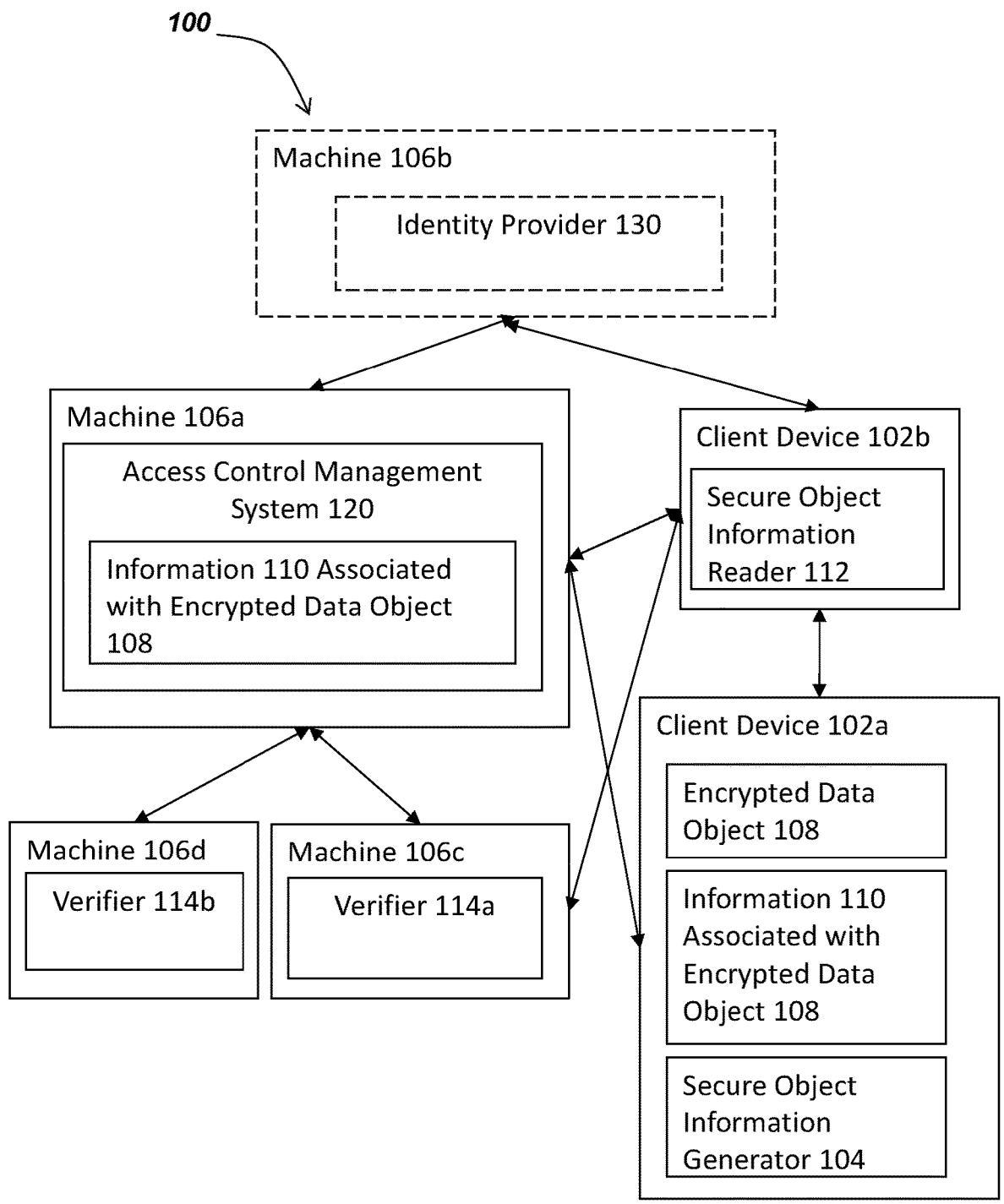
FIG. 1 is a block diagram depicting an embodiment of a system for restricting data access based on properties of at least one of a process and a machine executing the process.

Referring now to FIG. 1, a block diagram depicts one embodiment of a system for restricting data access based on properties of at least one of a process and a machine executing the process. In brief overview, the system 100 includes client devices iota-n (referred to generally as client devices 102), machines 106a-n (referred to generally as machines 106), an access control management system 120, a plurality of verifiers 114a-n (referred to generally as independent verifiers 114), an encrypted data object 108, information 110 associated with the encrypted data object 108, a secure object information generator 104, and a secure object information reader 112. The system 100 may include an identity provider 130 executing on a machine 106b. In some embodiments, the client devices 102a-n are clients 102 as described in detail below in connection with FIGS. 5A-5C. In other embodiments, the access control management system 120 and the verifiers 114a-n execute on machines 106a-n. The machines 106a-n may be remote machines 106, as described in detail below in connection with FIGS. 5A-5C. In further embodiments, the machines 106 and client devices 102 exchange data via networks 104 as described above in connection with FIG. 1A-1C. The system 100 may include a plurality of access control management systems 120.

A user of a client device 102a may select the same or different access control management systems 120 for different recipients of the encrypted data object 108 and each access control management system 120 may select the same or different independent verifier 114 to verify attributes of client devices 102. In some embodiments, the client device 102b is a machine 106 functioning as a client in that it receives an encrypted data object 108 from another client device 102a and requests information 110 associated with the encrypted data object 108 from an access control management system 120.

In one embodiment, the secure object information generator 104 is a software application executing on the client device 102a with which a user of the client device 102a may generate the information 110 associated with the encrypted data object 108; for example, and without limitation, the secure object information generator 104 may be provided as a stand-alone software application or as a plug-in or add-on to software executing on the client device 102a. In another embodiment, the user of the client device 102a executes the secure object information generator 210 to encrypt a document, thus generating the encrypted data object 206.

In one embodiment, a data object may be a document of any type, media file of any type, or other data object. In another embodiment, the data object is data in a format that natively supports encryption (e.g., PDF, compressed files, files generating using a word processing application such as, by way of example the MICROSOFT WORD application). In still another embodiment, the data object is data in a format that does not natively support encryption. In some embodiments, the data object is sensitive data a data owner wishes to protect; for example, the data object may contain medical imagery data sets including raw data containing personally identifiable information or other sensitive data. In one of these embodiments, the data owner may be under legal or other regulatory constraints requiring the data owner to maintain control over the data and/or to prevent unauthorized access to the data.

In one embodiment, the encrypted data object 108 includes a document in a self-describing format (e.g., an eXtended Markup Language (XML) format) that supports strong symmetric encryption, digital signatures via asymmetric encryption, unique identifiers, and data objects (e.g., documents, images multimedia, Portable Document Format (PDF) documents). In another embodiment, an encrypted data object 108 includes a unique identifier, a display name, and an identification of a type of the data object.

In some embodiments, the encrypted data object 108 includes an identifier of the access control management system 120. In one of these embodiments, the secure object information generator 104 includes the identifier (which may be provided, for example, and without limitation, as a uniform resource locator) and the computing device 102b uses the identifier to request the information 110 from the access control management system 120. In another of these embodiments, the identifier of the access control management system 120 is included in an unencrypted portion of the encrypted data object 108, such as an unencrypted header.

In some embodiments, the secure object information generator 104 includes functionality for encrypting data objects. In one of these embodiments, the secure object information generator 104 includes at least one encryption engine for encrypting or decrypting data objects. In other embodiments, the secure object information generator 104 generates an identifier for the encrypted data object 108 and includes the identifier in the information 110 that is transmitted to the access control management system 120. In other embodiments, the secure object information generator 104 requests that the access control management system 120 generate an identifier for the encrypted data object 108.

In one embodiment, the secure object information generator 104 processes a data object to generate an encrypted data object 108 and information 110 associated with the encrypted data object 108. The information 110 may be, for example, a registration payload containing information such as an encryption key used to encrypt the data object 108 and an access control list specifying users who may receive the encryption key to decrypt the underlying data object. In one embodiment, the information 110 includes at least one identification of a user authorized to receive the encryption key; for example, the information 110 may include an email address for each authorized user. The encryption key may itself by encrypted using a public key (e.g., a public key of the sender or of the recipient).

In one embodiment, the information 110 includes at least one identification of an attribute required of a process or machine seeking to access an encryption key for decrypting the encrypted data object 108. By way of example, and without limitation, the information 110 may include an identification of a version of code that is to be executing on a machine seeking access to the encryption keys, an identification of a type of functionality to be provided by a machine seeking access to the encryption keys, an identification of a type of certification required of either a process or a machine or both, an identification of a type of third-party verification of an attribute of either a process or a machine or both. As one example, the information 110 may specify that a process seeking to access the underlying data object must provide functionality for de-identification of personally identifiable information in a data set. As another example, the information 110 may specify that a process seeking to access the underlying data object must provide functionality for any type of redaction of sensitive portions of data (including, without limitation, redaction of specific content and anonymization or otherwise "scrubbing" of sensitive data). As another example, the information 110 may specify that a process seeking to access the underlying data object must provide functionality for anonymization of personally identifiable information in a data set. As a further example, the information 110 may specify that a process seeking to access the underlying data object must provide functionality for limiting a level of resolution at which an imagery set may be displayed by a machine (e.g., limiting the level of resolution to 200 pixels per inch (PPI) instead of 3,000 PPI). As yet another example, the information 110 may specify that a third-party verifier must provide verification that the machine or process seeking access to the underlying data object has the attribute or attributes specified. In some embodiments, the information 110 may specify that a process attribute restriction should be enforced when a data set a process seeks to access has a particular attribute. For example, the information 110 may specify that if the data set a process seeks to access includes personally identifiable information, then the process must have one or more attributes before it may access the data set. Restrictions to data access may include preventing the process from accessing the data, preventing a computing device executing the process from retrieving or otherwise accessing a copy of the data, preventing the process from performing a subset of the process functionality, preventing the transmission of cryptographic keys that enable the decryption of the data to the machine executing the process, or other access control mechanisms. Restrictions to data may include policies that are to be applied to output resulting from a process accessing the data. Restrictions to a first data set may be combined with restrictions to a second data set to generate a policy to be applied to output resulting from a process accessing the first data set and the second data set. A policy engine (not shown) may be used to assess policies, apply policies, and generate policies to apply to output.

In some embodiments, the secure object information reader 112 allows a user to access information 110 generated by the secure object information generator 210. In some embodiments, and as will be described in greater detail below, the secure object information reader 112 includes functionality allowing a client device 102 to communicate with the access control management system 120 and the independent verifier 114 to be verified as specified by the information 110 in order to receive the information 110. In other embodiments, the secure object information reader 112 also includes at least one encryption engine for encrypting or decrypting data objects. In further embodiments, the secure object information generator 104 and the secure object information reader 112 are provided as application plug-ins, web services, or stand-alone applications. As will be understood by one of ordinary skill in the art, the secure object information generator 104 and the secure object information reader 112 may each include the functionality of the other.

In one embodiment, the access control management system 120 optionally includes an identity provider selector identifying a plurality of identity providers 130 and selecting one of the plurality of identity providers 130 for authentication of a user of a client device 102b. For example, the identity provider selector may receive an enumeration of user identifiers from the secure object information reader 112 and analyze each enumerated user identifier in the enumeration to determine which identity providers 130 to access for authentication of each enumerated user identifier; for instance, by analyzing a domain name included in the user identifier and querying a database to identify an identity provider 130 associated with the analyzed domain name. In another embodiment, the access control management system 120 uses an interface to the identity provider 130 through which the access control management system 120 may make authentication requests. For example, the access control management system 120 may establish an interface to an identity provider 130 that provides an interface according to a federated identity standard such as OpenID, Information Card (InfoCard), or SAML standards. In still another embodiment, the access control management system 202 includes functionality for communicating with identity providers using different communications standards.

The access control management system 120 includes functionality for verifying that the user of the second client device 102b is identified in the received information associated with the encrypted data object. For example, the access control management system 120 may include functionality for analyzing the received information 110 to determine whether the information 110 includes an identifier of the user. As another example, the access control management system 120 may include functionality for analyzing an access control list included in the received information 208 to determine whether the user is on the access control list.

In some embodiments, the access control management system 120 includes a transaction log in which it stores an identification of at least one of: transactions, users, groups, roles, information 110 associated with each user, policies and business rules. In one of these embodiments, the access control management system 120 issues unique identifiers for data objects, transmitting the unique identifier to the secure object information generator 104 that generates the information 110. By tracking access requests, both valid and invalid, usage statistics can be gathered about who is accessing data and for how long, as well as from where unauthorized access attempts are being made. This capability can enable data owners or stewards to understand what data objects are useful, as well as who they may want to add or remove from their access control lists.

In some embodiments, the verifier 114 is a third-party verification provider that receives requests from access control management system 120 and communicates with the client device 102b to determine whether a process executed by the client device 102b and/or the client device 102b itself satisfies a requirement identified in the information 110 and provided to the independent verifier 114 by the access control management system 120. For example, the verifier 114 may perform a static analysis of deterministic signatures. In some embodiments, the access control management system 120 executes functionality to verify that the client device 102b satisfies a requirement of the information 110. In other embodiments, the information 110 may specify that verification services of one of a plurality of verifiers 114a-n must be provided by a verifier 114 independent of the access management system 120. The information 110 may include an identifier of each of a plurality of verifiers 114. Other embodiments of verification systems include those that rely on use of externally verifiable tokens. Further embodiments of verifications systems include those that have a third-party server receiving a signed data object identifying an entity, where the signature may be cryptographically verified to have been performed by a known entity.

Figure 2:
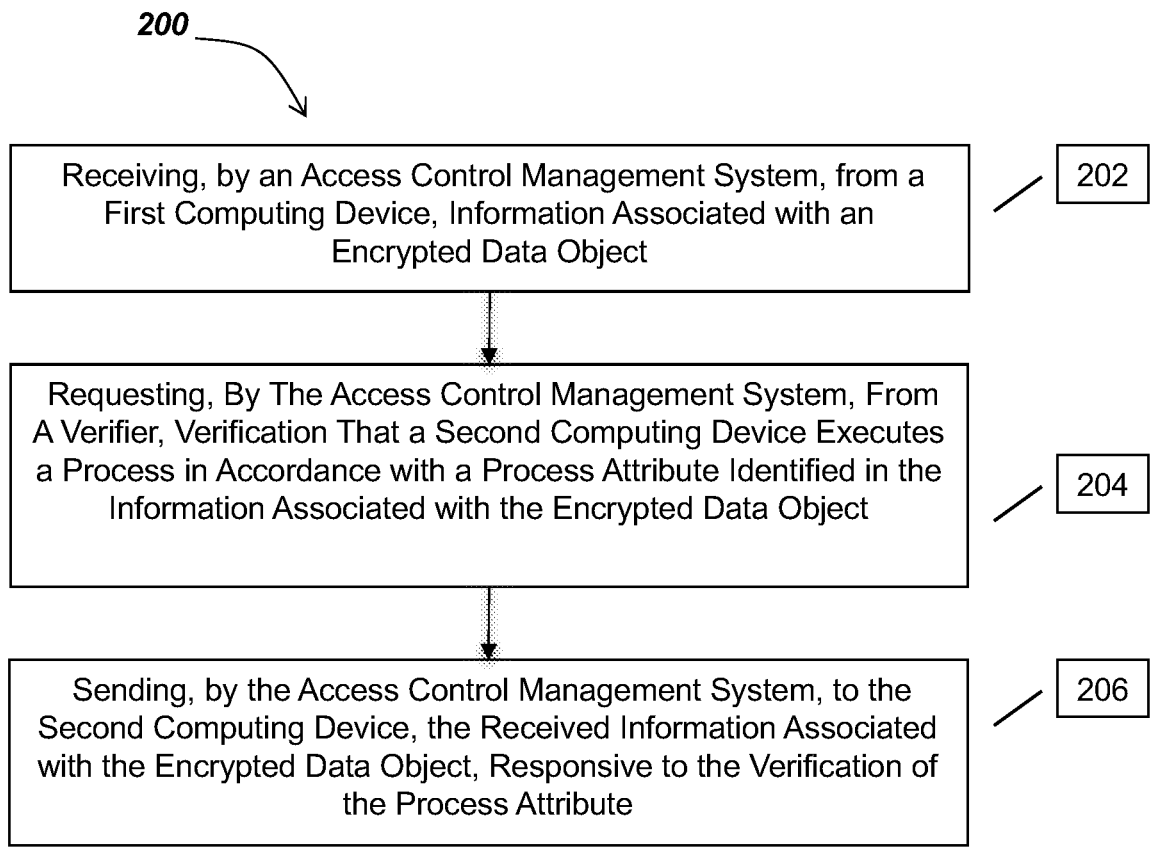
FIG. 2 is a flow diagram depicting an embodiment of a method for restricting data access based on properties of at least one of a process and a machine executing the process.

Referring now to FIG. 2, a flow diagram depicts one embodiment of a method 200 for restricting data access based on properties of at least one of a process and a machine executing the process. In brief overview, the method 200 includes receiving, by an access control management system, from a first computing device, information associated with an encrypted data object (202). The method 200 includes requesting, by the access control management system, from a verifier, verification that a second computing device executes a process in accordance with a process attribute identified in the information associated with the encrypted data object (204). The method 200 includes sending, by the access control management system, to the second computing device, the received information associated with the encrypted data object, responsive to the verification of the process attribute (206).

Referring now to FIG. 2 in greater detail, and in connection with FIG. 1, the access control management system receives, from a first computing device, information associated with an encrypted data object (202). In one embodiment, before sending the information 110 to the access control management system 120, a user of the first client device 102 executes the secure object information generator 104 to encrypt the data object and generate the information 110.

In one embodiment, the secure object information generator 104 generates the information 110 based upon information provided by the user of the first client device 102a. In another embodiment, the information 110 includes an identifier of the data object, cryptographic data associated with the encrypted data object 108 (e.g., a key for decrypting the encrypted data object 108), and an identification of at least one process attribute, that is, an attribute of either a process or a machine executing the process, that is required before the process may access the data object. In some embodiments, the information 110 optionally includes an identifier of each individual authorized to receive the cryptographic data. In still another embodiment, the information 110 includes an identifier of the data object and cryptographic data associated with the encrypted data object 108 (e.g., a key for decrypting the encrypted data object 108).

In some embodiments, the access control management system 120 receives the information 110 from the first client device 102a via an interface between the secure object information generator 104 executing on the first client device 102a and a secure object information reader executing on the access control management system 120. In other embodiments, the access control management system 120 and the first client device 102a establish a secure connection for transmission of the information 110, through the use of well-established key exchange protocols.

In some embodiments, the access control management system 120 receives information including a user identifier associated with the user of the second client device 102b. In one of these embodiments, the access control management system 120 selects the identity provider 130 with which to authenticate the user of the second client device 102b from a plurality of identity providers 130a-n (b-n, not shown), based on the received user identifier.

In one embodiment, the access control management system 120 provides an interface with which the user of the first client device 102a can modify the information 110 stored by the access control management system 120. In another embodiment, the user of the first client device 102a generates a modified version of the information 110 and transmits the modified version to the access control management system 120. In some embodiments, the ability to modify an existing enumeration of authorized users or of requirements of a process or machine seeking access to data objects allows users to add, modify, or revoke access quickly.

In one embodiment, the access control management system 120 stores the received information 110 in a database. In some embodiments, the database is an ODBC-compliant database. For example, the database may be provided as an ORACLE database, manufactured by Oracle Corporation of Redwood Shores, Calif. In other embodiments, the database can be a Microsoft ACCESS database or a Microsoft SQL server database, manufactured by Microsoft Corporation of Redmond, Wash. In still other embodiments, the database may be a custom-designed database based on an open source database, such as the MYSQL family of freely available database products distributed by MySQL AB Corporation of Uppsala, Sweden. In other embodiments, examples of databases include, without limitation, structured storage (e.g., NoSQL-type databases and BigTable databases), HBase databases distributed by The Apache Software Foundation of Forest Hill, Md., MongoDB databases distributed by 10Gen, Inc., of New York, N.Y., and Cassandra databases distributed by The Apache Software Foundation of Forest Hill, Md. In further embodiments, the database may be any form or type of database.

In some embodiments, the access control management system receives, from a second client device, a request for the information associated with the encrypted data object. In one embodiment, the second client device 102b transmits the request to the access control management system 202 after receiving an instruction from the first client device iota to transmit the request. In one embodiment, the first client device iota transmits the encrypted data object to the second client device 102b. A user of the first client device iota may send an instruction to the user of the second client device 102b, for example, and without limitation, via electronic communication such as an electronic mail message (e.g., "email") or message sent via a short message service protocol (e.g., "text message"). For example, the user of the first client device iota may send a message to the user of the second client device 102b including the encrypted data object and an instruction to retrieve cryptographic data for decrypting the document from the access control management system 120 (e.g., by including a uniform resource locator (URL) in the message to provide a link to the access control management system 202). As another example, when the user of the second client device 102b attempts to access the encrypted data object 108, the user is instructed to execute the secure object information reader 112, which may automatically begin the process of establishing authenticating the user to and establishing a secure connection with the access control management system 120. In some embodiments, the user of the second client device 102b includes an identifier of the identity provider 130 with the request for the information 110. Those of ordinary skill in the art will understand that although the "user" of the second client device 102b may be a human user, it may also be a process executing on the second client device 102b programmed to provide the requested information to the access control management system 120 and/or the identity provider 130. Furthermore, those of ordinary skill in the art will understand that while the device 102b is considered a "client" in connection with its interactions with the access control management system 120 and/or the identity provider 130, the device 102b may provide server functionality in connection with other computing devices.

In some embodiments, the access control management system optionally authenticates, with an identity provider 130, the user of the second client device. In some of these embodiments, the system 100 may include a plurality of identity providers 130 from which the access control management system 120 identifies an identity provider 130 that can authenticate the user of the second client device 102b. In one embodiment, the access control management system 120 determines that the identity provider 130 stores authentication information for the user of the second client device 102b, based on a user identifier. For example, the information 110 may include the user identifier. In one embodiment, the access control management system 120 sends a request to the identity provider 130 to authenticate the user of the second client device 102b; the identity provider 130 then communicates with the second client device 102b to authenticate the user.

The method 200 includes requesting, by the access control management system, from a verifier, verification that a second computing device executes a process in accordance with a process attribute identified in the information associated with the encrypted data object (204). In some embodiments, the access control management system 120 selects the verifier based upon the identifier in the received information 110. In some embodiments, the access control management system 120 provides the verifier with an identifier of the machine and either at least one machine hardware attribute or at least one machine software attribute or both least one machine hardware attribute and at least one machine software attribute, the provided data presented in a way that is cryptographically verifiable.

The method 200 includes sending, by the access control management system, to the second computing device, the received information associated with the encrypted data object, responsive to the verification of the process attribute (206). In one embodiment, the access control management system 120 establishes a secure connection to the second client device 102*b* upon authentication of the user of the second client device 102*b*. In some embodiments, the secure object information reader 112 executing on the second client device 102*b* includes a public key associated with the access control management system 120 with which the second client device 102*b* may establish a secure connection to the access control management system 120. In other embodiments, the access control management system 120 establishes a secure communication channel with the second client device 102*b* through the use of well-established key exchange protocols.

In some embodiments, the access control management system 120 sends all of the received information 110 to the second client device 102*b*. In other embodiments, the access control management system 120 sends a subset of the received information 110 to the second client device 102*b*. In one embodiment, the second client device 102*b* decrypts the encrypted data object 108 with a cryptographic key included in the received information 110. In some embodiments, the cryptographic key is not accessed by the user of the second client device 102*b* but delivered to trusted services and applications in memory 122. In one of these embodiments, the cryptographic key is not stored in storage 128 of the second client device 102*b*, to prevent the user of the second client device 102*b* from accessing the cryptographic key directly. In other embodiments, cryptographic keys are delivered in a persistent ticket (much like a web cookie). In this way, users have the ability to decrypt an encrypted data object 206 for viewing even if there is no network access to the access control management system 120.

As will be understood by those of ordinary skill in the art, the client device 102*a* may send the same encrypted data object 108 to a plurality of recipient client device 102*b*-*n* and may specify the same or different verifiers 114*a*-*n* and, optionally, the same or different identity providers 130, for each of the plurality of recipient client devices 102; similarly, the client device 102*a* may send different encrypted data objects 108 to a plurality of recipient client devices 102*b*-*n* and may specify the same or different verifiers 114*a*-*n* and, optionally, the same or different identity providers 130, for each of the plurality of recipient client devices 102.

The methods and systems described above specify that the client device 102 may generate the encryption keys used to protect data before it is distributed to other machines. However, in some embodiments, it would be preferable for the client device 102 not to have to generate the encryption keys. For example, in an environment in which an entity has a plurality of client devices and wishes to provide centralized key management support, the client device may not generate the encryption keys but may interact with a key management service. As indicated above, in some embodiments, data owners may wish to store data objects in multi-tenant machines provided by third-party storage providers (e.g., "in the cloud") and may also wish or need to provide key management services to each of the clients that may need to distribute or access cryptographic data. In one such embodiment, as will be discussed in detail in connection with FIGS. 3 and 4, data owners may leverage multi-tenant machines that provide trusted execution environments and encrypted memory regions in order to securely store sensitive data such as cryptographic data or services (e.g., by executing a key management service or other transactional service within a trusted execution environment). Methods and systems described herein may provide a simple-to-use platform to manage distribution of sensitive data (including but not limited to cryptographic data) across a set of constantly-changing devices with different hardware identities and supporting multiple tenants, allowing users to benefit from high-availability and lower costs due to multiple tenancy.

Figure 3:
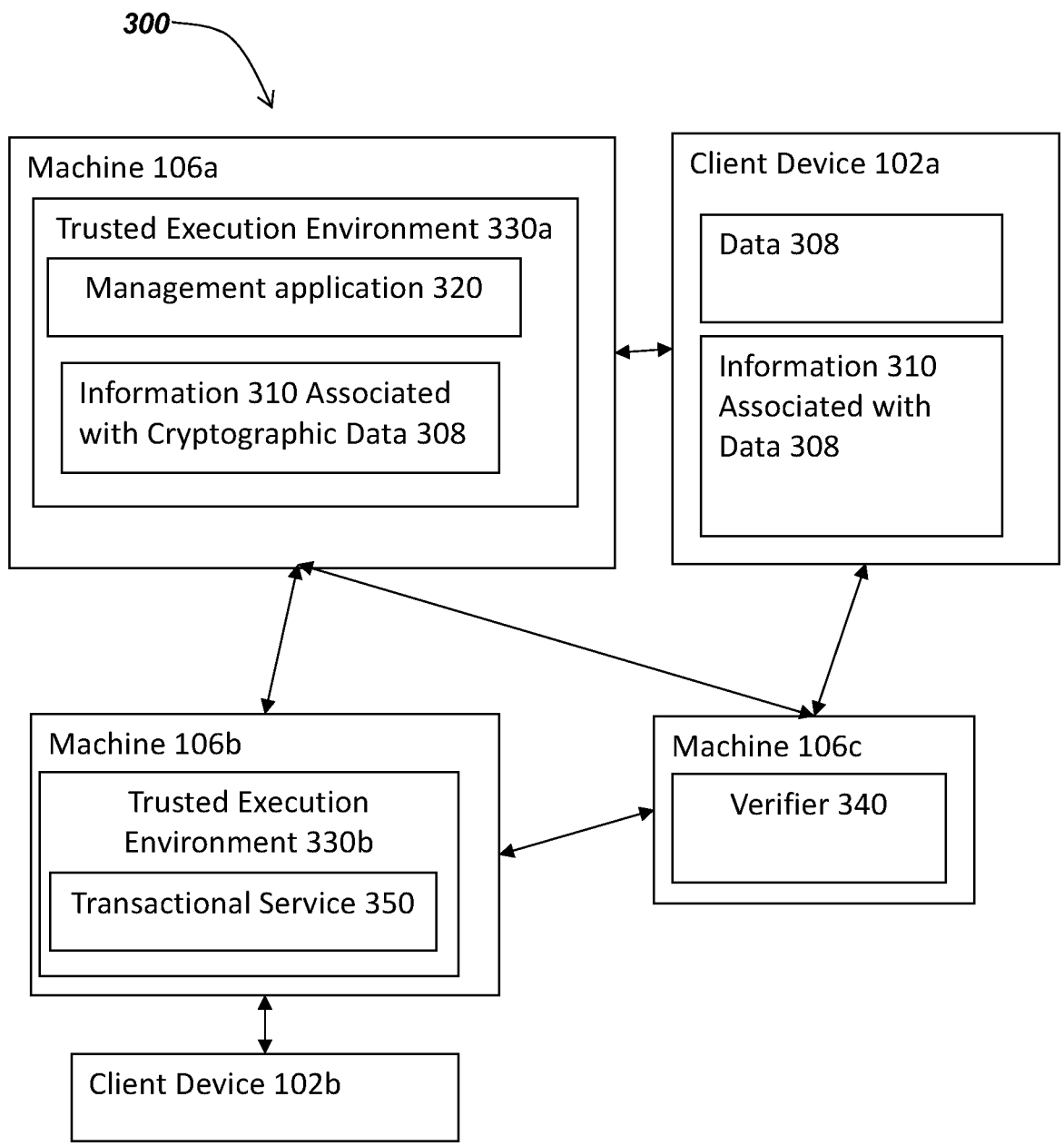
FIG. 3 is a block diagram depicting an embodiment of a system for secure distribution, in a multi-tenant remote computing environment, of cryptographic data.

Referring now to FIG. 3, a system 300 provides functionality for secure data distribution in a multi-tenant remote computing environment. The system 300 includes a first of a plurality of multi-tenant computing devices 106*a* having a trusted execution environment 330*a*, in which a management application 320 executes, and a client device iota having data 308 and information 310 associated with the data 308 to distribute. The plurality of multi-tenant computing devices 106 may provide high availability and scalable services to client devices 102. Each of the plurality of multi-tenant computing devices 106 may provide a protected region of physical memory and a trusted execution environment in which to securely execute protected applications. As one example, the protected region may be an encrypted region of physical memory. As another example, the protected region may be an obfuscated region of physical memory. By way of example, and without limitation, the plurality of multi-tenant computing devices 106 may implement a set of application programming interfaces and protected memory regions such as those available in implementations of INTEL SOFTWARE GUARD EXTENSIONS (SGX) or of Hardware Security Modules. The system 300 also includes a verifier 340 that provides verification services to confirm attributes of machines providing such trusted execution environments. The system 300 may include a plurality of client devices iota-n, sending and receiving data 308 and interacting with services executing within trusted execution environments 330 to exchange and propagate data. In some embodiments, the system 30*o* implements an active-standby configuration pattern such that a subset of the plurality of multi-tenant computing devices 106 may act as a back-up in the event that the one of the plurality of multi-tenant computing devices 106 that executes the management application 320 experiences a failure.

Figure 4:
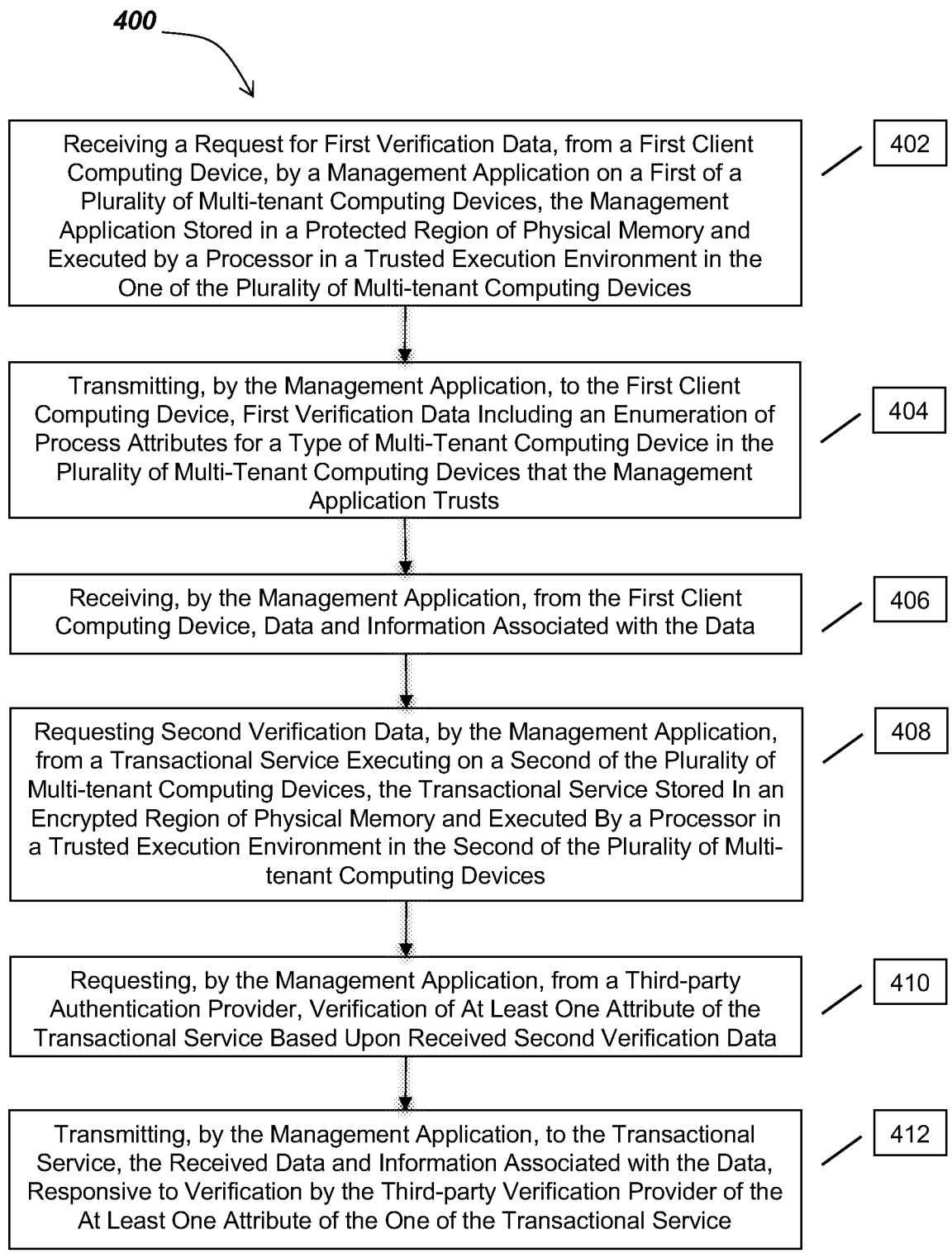
FIG. 4 is a flow diagram depicting an embodiment of a method for secure distribution, in a multi-tenant remote computing environment, of cryptographic data.

Regarding FIG. 4, and in connection with FIG. 3, a flow diagram depicts one embodiment of a method for secure distribution, in a multi-tenant remote computing environment of data. The method 400 includes receiving a request for first verification data, from a first client computing device, by a management application on a first of a plurality of multi-tenant computing devices, the management application stored in an encrypted region of physical memory and executed by a processor in a trusted execution environment in the one of the plurality of multi-tenant computing devices (402). The method 400 includes transmitting, by the management application, to the first client computing device, first verification data including an enumeration of process attributes for a type of multi-tenant computing device in the plurality of multi-tenant computing devices that the management application trusts (404). The method 400 includes receiving, by the management application, from the first client computing device, data and information associated with the data (406). The method 400 includes requesting second verification data, by the management application, from a transactional service executing on a second of the plurality of multi-tenant computing devices, the transactional service stored in an encrypted region of physical memory and executed by a processor in a trusted execution environment in the second of the plurality of multi-tenant computing devices (408). The method 400 includes requesting, by the management application, from a third-party authentication provider, verification of at least one attribute of the transactional service based upon the second verification data (410). The method 400 includes transmitting, by the management application, to the transactional service, the received data and information associated with the data, responsive to verification by the third-party verification provider of the at least one attribute of the transactional service (412).

Regarding FIG. 4, and in additional detail, the method 400 includes receiving a request for first verification data, from a first client computing device, by a management application on a first of a plurality of multi-tenant computing devices, the management application stored in an encrypted region of physical memory and executed by a processor in a trusted execution environment in the one of the plurality of multi-tenant computing devices (402). The management application 320 may transmit, to the first client computing device 102a, first verification data including an identification of an attribute of the trusted execution environment on the first of the plurality of multi-tenant computing devices executing the management application. Attributes may include attributes of hardware and/or of the device on which the management application 320 executes and an identification of attribute that the management application 320 requires from other devices (such as, without limitation, devices executing transactional services). The management application 320 may transmit, to the first client computing device 102a, first verification data including an identification of an attribute of the encrypted region of physical memory storing the management application. The management application 320 may transmit, to the first client computing device 102a, first verification data formatted in compliance with a formatting request specified by the first client computing device 102a.

The method 400 includes transmitting, by the management application, to the first client computing device, first verification data including an enumeration of process attributes for a type of multi-tenant computing device in the plurality of multi-tenant computing devices that the management application trusts (404). Thus, in addition to including data about the management application and/or about the machine executing the management application for use in verifying an attribute of the management application and/or the machine executing it, the first verification data includes information about a different type machine in the plurality of multi-tenant computing devices, one that does not execute the management application but a different service (e.g., a transactional service of any kind including, without limitation, key management services or access control management services). As the first verification data includes data for a type of machine—not a particular machine but any machine having the properties identified in the first verification data—the first client computing device receives information regarding properties of machines to which the management application may, in the future, propagate data received from the first client computing device; in this way, if a machine is added to the plurality of multi-tenant computing devices, for example, the management application may verify one or more attributes about the machine or a process executed by the machine or both, identified in the first verification data previously provided to the first client computing device, and then propagate data to that newly added machine without needing to request authorization to do so from the first client computing device. Attributes may be defined by the transactional service and the client would be able to inspect, verify, and choose whether to trust the service. Attributes may include attributes associated with the type of machines the management application 320 will trust. Attributes may include attributes associated with a process executing on a machine such as an ability of the process to implement business logic, de-identification, anonymization, what type of output may be generated and how the output may be used, etc.

The first client computing device may forward the first verification data to the verifier 340 and request verification that the machine 106a has the properties it attests to having. Verification may include checking a signature.

The method 400 includes receiving, by the management application, from the first client computing device, data and information associated with the data (406). The first client computing device iota may send the data 308 and the information 310 associated with the data 308 responsive to receiving confirmation from the verifier 340 that the machine 106a has the properties it attests to having. The first client computing device iota may establish a secure connection to the management application 320 prior to transmitting the data 308 and the information 310 associated with the data 308 (including, for example and without limitation, encrypting data sent by the first client computing device iota with a public key generated by the management application 320). The data may be cryptographic data (e.g., cryptographic keys), other sensitive data, or any other type of data.

The management application 320 may determine to distribute the received data 308 and the information 310 associated with the data to at least one of the plurality of other multi-tenant computing devices. As will be understood by those of ordinary skill in the art, when a new machine becomes available and eligible for distribution of the data, the new machine may execute a discover mechanism (e.g., using a well-known DNS name) to find the management application 320 and request data; alternatively, or in addition, the management application 320 may query a data structure enumerating available machines and identify newly-added machines to which the management application 320 should distribute data.

The method 400 includes requesting second verification data, by the management application, from a transactional service executing on a second of a plurality of multi-tenant computing devices, the transactional service stored in an encrypted region of physical memory and executed by a processor in a trusted execution environment in the second of the plurality of multi-tenant computing devices (408). In some embodiments, transactional services execute on a subset of the plurality of multi-tenant computing devices that are executing behind a load balancing service. The management application 320 may receive verification data including an identification of an attribute of the trusted execution environment on the first of the plurality of multi-tenant computing devices executing the transactional service. The management application 320 may receive verification data including an identification of an attribute of the encrypted region of physical memory storing the transactional service.

The method 400 includes requesting, by the management application, from a third-party authentication provider, verification of at least one attribute of the transactional service based upon the second verification data (410). In some embodiments, the management application provides the second verification data to the third-party authentication provider. In some embodiments, the management application provides data including a description of an identity of the transactional service or of the machine executing the transactional service, signed by a well-known public key of a trusted authority. The verification may be performed locally or remotely.

In some embodiments, the third-party authentication provider is an entity independent of the entity that manages, operates, owns, or otherwise controls the plurality of multi-tenant computing devices (including a machine or machines in the plurality that execute the management application and/or the transactional service). In one of these embodiments, the third-party authentication provider executes functionality to verify the assertions presented in the verification data.

The method 400 includes transmitting, by the management application, to the one of the plurality of access control management systems, the received cryptographic data and information associated with the cryptographic data, responsive to verification by the third-party verification provider of the at least one attribute of the one of the plurality of access control management systems (410).

The management application 320 may verify a subset of the plurality of multi-tenant computing devices. For example, the management application 320 may request third verification data from a second transactional service executing on a third of a plurality of multi-tenant computing devices, the second transactional service stored in an encrypted region of physical memory and executed by a processor in a trusted execution environment in the third of the plurality of multi-tenant computing devices; the management application 320 may then request from the same or a different third-party independent verifier 340 verification of at least one attribute of the second of the transactional service based upon the second verification data and then transmit, to the second transactional service, the received data and information associated with the data, responsive to verification by the third-party verification provider of the at least one attribute of the second of the plurality of access control management systems. The management application 320 may verify all of the plurality of multi-tenant computing devices or a subset of the plurality of multi-tenant computing devices.

Once one of the plurality of multi-tenant computing devices executing a transactional service receives the data from the management application 320, it may process requests for data from one or more client devices. For example, the transactional service may receive, from a second client computing device, a request for the data, authenticate a user of the second client computing device, and send the second client computing device the data, responsive to the authentication. Similarly, the transactional service may respond to a request from the first client computing device; for example, the transactional service may receive, from the first client computing device a request for the data, authenticate a user of the first client computing device, and send to the first client computing device, the data, responsive to the authentication.

In some embodiments, the one of the plurality of multi-tenant computing devices executing the transactional service provides distributed authentication of a user of a client device requesting access to the cryptographic data. In such embodiments, the transactional service may be one of a plurality of access control management systems, each executing on one of the plurality of multi-tenant computing devices. As described in commonly owned U.S. Pat. No. 9,578,021, the one of the plurality of access control management systems may receive, from a second client computing device, a request for the cryptographic data, the request including an identifier of an identity provider in a plurality of identifiers. The one of the plurality of access control management systems may verify that a user of the second computing device is identified in the received information associated with the cryptographic data. The one of the plurality of access control management systems may select the identity provider from the plurality of identity providers, based on the identifier included in the request for the received information associated with the cryptographic data. The one of the plurality of access control management systems may request, from the selected identity provider, authentication of the user of the second client device. The one of the plurality of access control management systems may send to the second computing device, the cryptographic data, responsive to the authentication by the selected identity provider of the user of the second client device.

The data described above may include a variety of types of data. The data may be an encryption key or other cryptographic data. However, the data may also be software of any type. For example, the cryptographic data may be a key management service. As another example, the cryptographic data may be an access control manager.

In some embodiments, implementing the methods and systems described herein provides improved functionality for adding hosts (e.g., scaling up) to accommodate increased traffic. In other embodiments, implementing the methods and systems described herein provides improved functionality for using different fault domains across which to spread a service resulting in a more fault tolerant service. In further embodiments, implementing the methods and systems described herein provides improved functionality for leveraging an ability of a client to trust an attribute of a type of transaction service host that will be trusted by the management application 320, rather than having to identify each new host and establish a trusted connection with the individual new host; this allows high availability activities (e.g., host replacement and scale-up) to execute in a way that is trusted by the client without needing to interact with the client.

In some embodiments, the transactional service is a key management service. For example, a first entity that controls (e.g., owns, manages, maintains, is affiliated with or otherwise controls) the first client computing device may use a plurality of multi-tenant computing devices controlled (e.g., owned, managed, maintained, etc.) by a second entity and the first entity may direct the installation of a key management service on one of the plurality of multi-tenant computing devices. In other embodiments, the transactional service is an access control management system. For example, a first entity that controls (e.g., owns, manages, maintains, is affiliated with or otherwise controls) the first client computing device may use a plurality of multi-tenant computing devices controlled (e.g., owned, managed, maintained, etc.) by a second entity and the first entity may direct the installation of an access control management system on one of the plurality of multi-tenant computing devices. In some embodiments, implementation of methods and systems described herein provide an entity with functionality for leveraging the benefits of multi-tenant computing devices (e.g., "cloud" computing) such as decreased management requirements, decreased costs, and decreased technical infrastructure to maintain, while implementing enhanced security techniques to safeguard sensitive data and ensuring, via the management application, that sensitive data may be distributed securely amongst the plurality of multi-tenant computing devices such that any client device associated with the entity seeking the sensitive data may be directed to any one of the plurality of multi-tenant computing devices and access the sensitive data without the entity itself having to manage validation of each machine in the plurality of multi-tenant computing devices and propagation of data across each of them.

In some embodiments, implementation of the methods and systems described herein provide a variety of technological improvements. For example, separation of management functionality provided by the management application 320 from the key management and access control management services allows for a high availability, load balanced, web service from the computing devices providing the key management and access control management services while the management application 320 proceeds independently without creating a single point of failure for all functionality while providing operability at scale. Without interfering with cryptographic services being provided (e.g., key management and access control management) or requiring a complex and failure-prone network architecture in which client applications would have to individually propagate cryptographic data as new machines become available or require updated information, the management application 320 can provide that functionality. The ability for hosts to be automatically replaceable or add-able results in a system that may provide a self-recovering, fault-tolerant service. (For example, hosts can fail for reasons out of an entity's control, like a power outage; in that case, a service making use of cloud HA best practices like auto-scaling would see new hosts automatically come online in a different fault domain not affected by the power outage, and those new hosts could be provisioned automatically in a way fully trusted by the client). The systems and methods described herein may also provide an improved level of reliability due to reduced complexity.

Referring now to FIGS. 5A, 5B, 5C, and 5D, block diagrams depict additional detail regarding computing devices that may be modified to execute functionality for implementing the methods and systems described above.

Figure 5A:
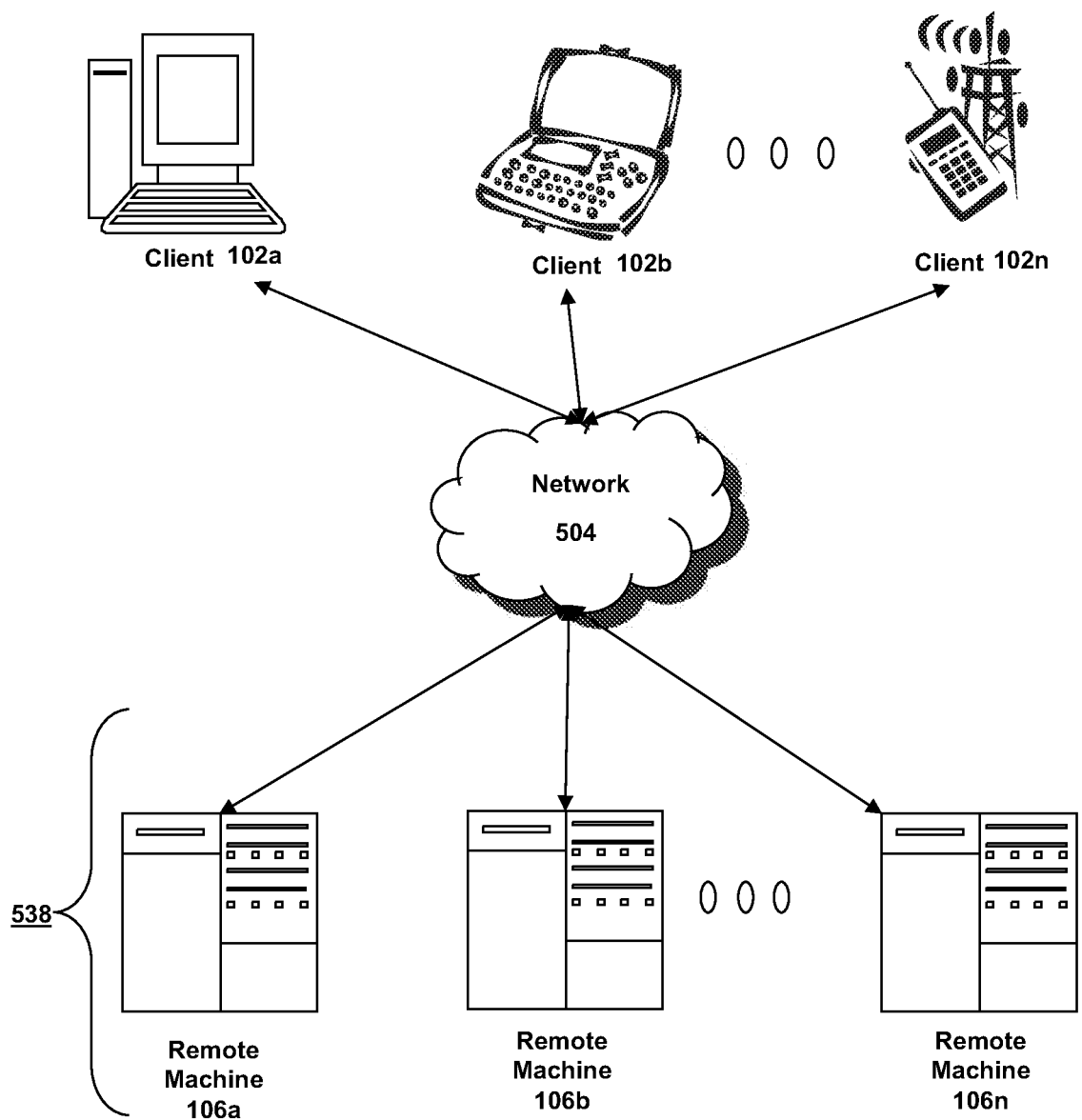
FIGS. 5A-5D are block diagrams depicting embodiments of computers useful in connection with the methods and systems described herein.

Referring now to FIG. 5A, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, computing device(s) 102, endpoint(s) 102, or endpoint node(s) 102) in communication with one or more remote machines 106a-106n (also generally referred to as server(s) 106, machine(s) 160, or computing device(s) 106) via one or more networks 504.

Although FIG. 5A shows a network 504 between the clients 102 and the remote machines 106, the clients 102 and the remote machines 106 may be on the same network 504. The network 504 can be a local area network (LAN), such as a company Intranet, a metropolitan area network (MAN), or a wide area network (WAN), such as the Internet or the World Wide Web. In other embodiments, there are multiple networks 504 between the clients 102 and the remote machines 106. In one of these embodiments, a network 504' (not shown) may be a private network and a network 504 may be a public network. In another of these embodiments, a network 504 may be a private network and a network 504' a public network. In still another embodiment, networks 504 and 504' may both be private networks. In yet another embodiment, networks 504 and 504' may both be public networks.

The network 504 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 504 may comprise a wireless link, such as an infrared channel or satellite band. The topology of the network 504 may be a bus, star, or ring network topology. The network 504 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 102 and a remote machine 106 (referred to generally as computing devices 500) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein.

In one embodiment, a computing device 106 provides functionality of a web server. In some embodiments, a web server 106 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems of Santa Clara, Calif.

In some embodiments, the system may include multiple, logically-grouped remote machines 106. In one of these embodiments, the logical group of remote machines may be referred to as a server farm 538. In another of these embodiments, the server farm 538 may be administered as a single entity.

Figure 5B:
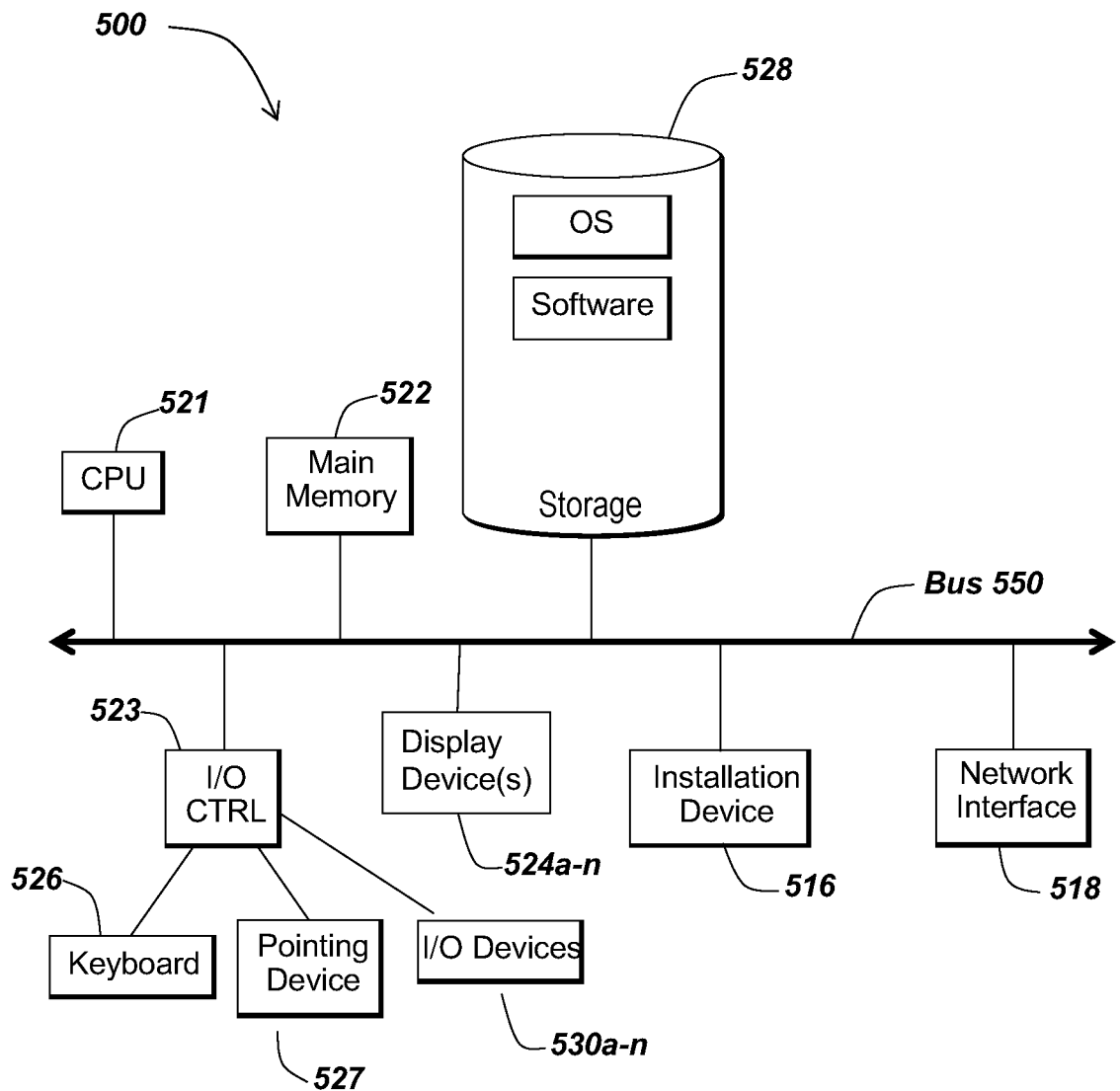
Figure 5C:
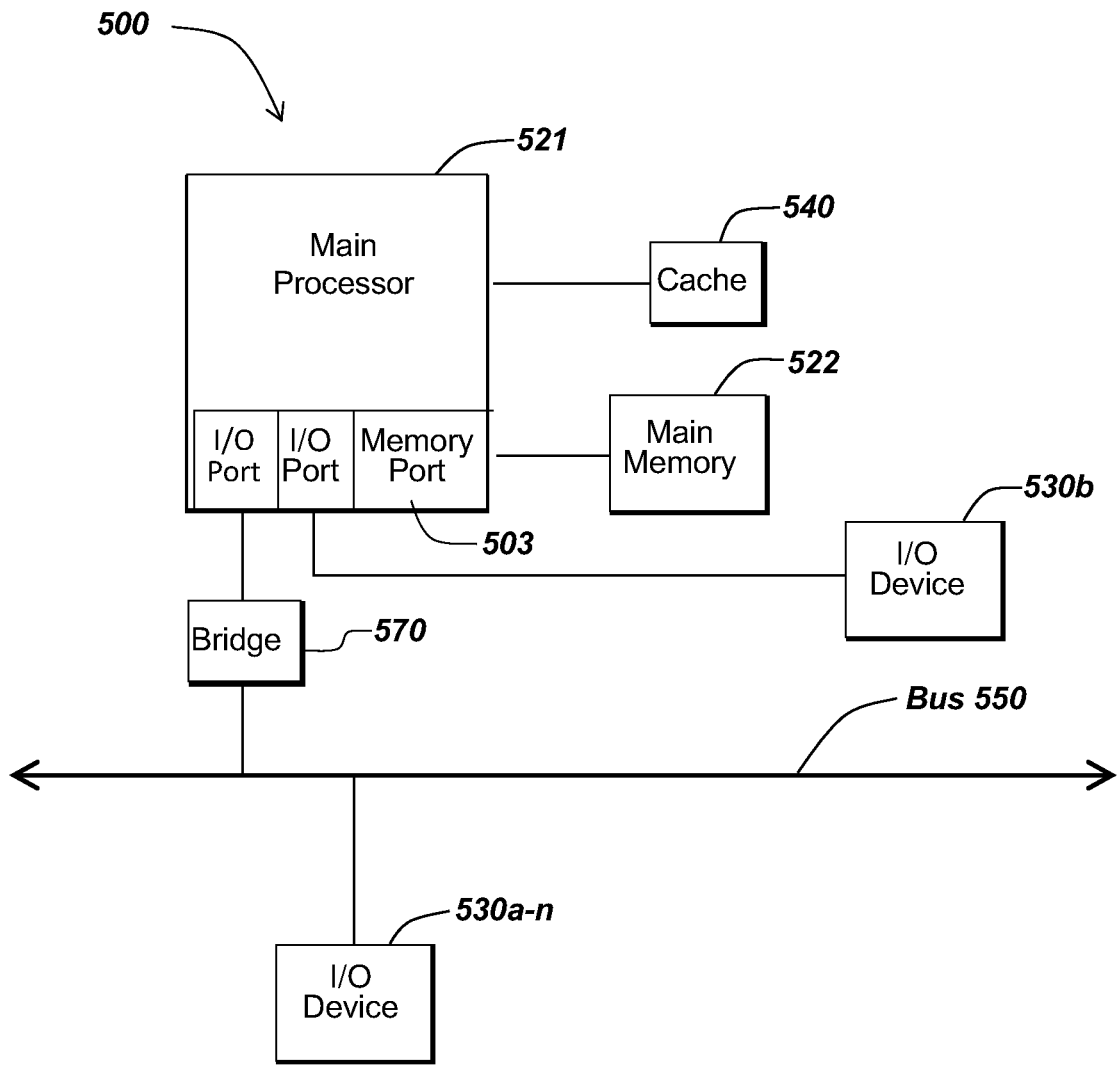

FIGS. 5B and 5C depict block diagrams of a computing device 100 useful for practicing an embodiment of the client 102 or a remote machine 106. As shown in FIGS. 5B and 5C, each computing device 500 includes a central processing unit 521, and a main memory unit 522. As shown in FIG. 5B, a computing device 500 may include a storage device 528, an installation device 516, a network interface 518, an I/O controller 523, display devices 524a-n, a keyboard 526, a pointing device 527, such as a mouse, and one or more other I/O devices 530a-n. The storage device 128 may include, without limitation, an operating system and software. As shown in FIG. 1C, each computing device 500 may also include additional optional elements, such as a memory port 503, a bridge 570, one or more input/output devices 530a-n (generally referred to using reference numeral 530), and a cache memory 540 in communication with the central processing unit 521.

The central processing unit 521 is any logic circuitry that responds to and processes instructions fetched from the main memory unit 522. In many embodiments, the central processing unit 521 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 100 may be based on any of these processors, or any other processor capable of operating as described herein.

Main memory unit 522 may be one or more memory chips capable of storing data and allowing any storage location to be directly accessed by the microprocessor 521. The main memory 522 may be based on any available memory chips capable of operating as described herein. In the embodiment shown in FIG. 5B, the processor 521 communicates with main memory 522 via a system bus 550. FIG. 5C depicts an embodiment of a computing device 500 in which the processor communicates directly with main memory 522 via a memory port 503. FIG. 5C also depicts an embodiment in which the main processor 521 communicates directly with cache memory 540 via a secondary bus, sometimes referred to as a backside bus. In other embodiments, the main processor 521 communicates with cache memory 540 using the system bus 550.

In the embodiment shown in FIG. 5B, the processor 521 communicates with various I/O devices 530 via a local system bus 550. Various buses may be used to connect the central processing unit 521 to any of the I/O devices 530, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 524, the processor 521 may use an Advanced Graphics Port (AGP) to communicate with the display 524. FIG. 5C depicts an embodiment of a computer 100 in which the main processor 521 also communicates directly with an I/O device 530b via, for example, HYPERTRANSPORT, RAPIDIO, or INFINIBAND communications technology. One or more of a wide variety of I/O devices 53a-n may be present in or connected to the computing device 100, each of which may be of the same or different type and/or form.

Referring still to FIG. 5B, the computing device 500 may support any suitable installation device 516, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 500 may provide functionality for installing software over a network 504. The computing device 500 may further comprise a storage device, such as one or more hard disk drives or redundant arrays of independent disks, for storing an operating system and other software. Alternatively, the computing device 500 may rely on memory chips for storage instead of hard disks.

Furthermore, the computing device 500 may include a network interface 518 to interface to the network 504 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 500 communicates with other computing devices 500' via any type and/or form of gateway or tunneling protocol such as Secure Socket Layer (SSL) or Transport Layer Security (TLS). The network interface 518 may comprise a built-in network adapter, network interface card, PCMCIA network card, card bus network adapter, wireless network adapter, USB network adapter, modem, or any other device suitable for interfacing the computing device 100 to any type of network capable of communication and performing the operations described herein.

In further embodiments, an I/O device 530 may be a bridge between the system bus 550 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 500 of the sort depicted in FIGS. 5B and 5C typically operates under the control of operating systems, which control scheduling of tasks and access to system resources. The computing device 500 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, WINDOWS 10, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; Red Hat Enterprise Linux, a Linus-variant operating system distributed by Red Hat, Inc., of Raleigh, N.C.; Ubuntu, a freely-available operating system distributed by Canonical Ltd. of London, England; or any type and/or form of a Unix operating system, among others.

The computing device 500 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 100 may have different processors, operating systems, and input devices consistent with the device. In other embodiments, the computing device 100 is a mobile device, such as a JAVA-enabled cellular telephone/smartphone or personal digital assistant (PDA). The computing device 500 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research In Motion Limited of Waterloo, Ontario, Canada. In yet other embodiments, the computing device 100 is a smartphone, POCKET PC, POCKET PC PHONE, or other portable mobile device supporting Microsoft Windows Mobile Software.

In some embodiments, the computing device 500 comprises a combination of devices, such as a mobile phone combined with a digital audio player or portable media player. In one of these embodiments, the computing device 500 is a device in the Google/Motorola line of combination digital audio players and mobile phones. In another of these embodiments, the computing device 500 is a device in the IPHONE smartphone line of devices manufactured by Apple Inc. In still another of these embodiments, the computing device 500 is a device executing the ANDROID open source mobile phone platform distributed by the Open Handset Alliance; for example, the device 500 may be a device such as those provided by Samsung Electronics of Seoul, Korea, or HTC Headquarters of Taiwan, R.O.C. In other embodiments, the computing device 500 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex.

Figure 5D:
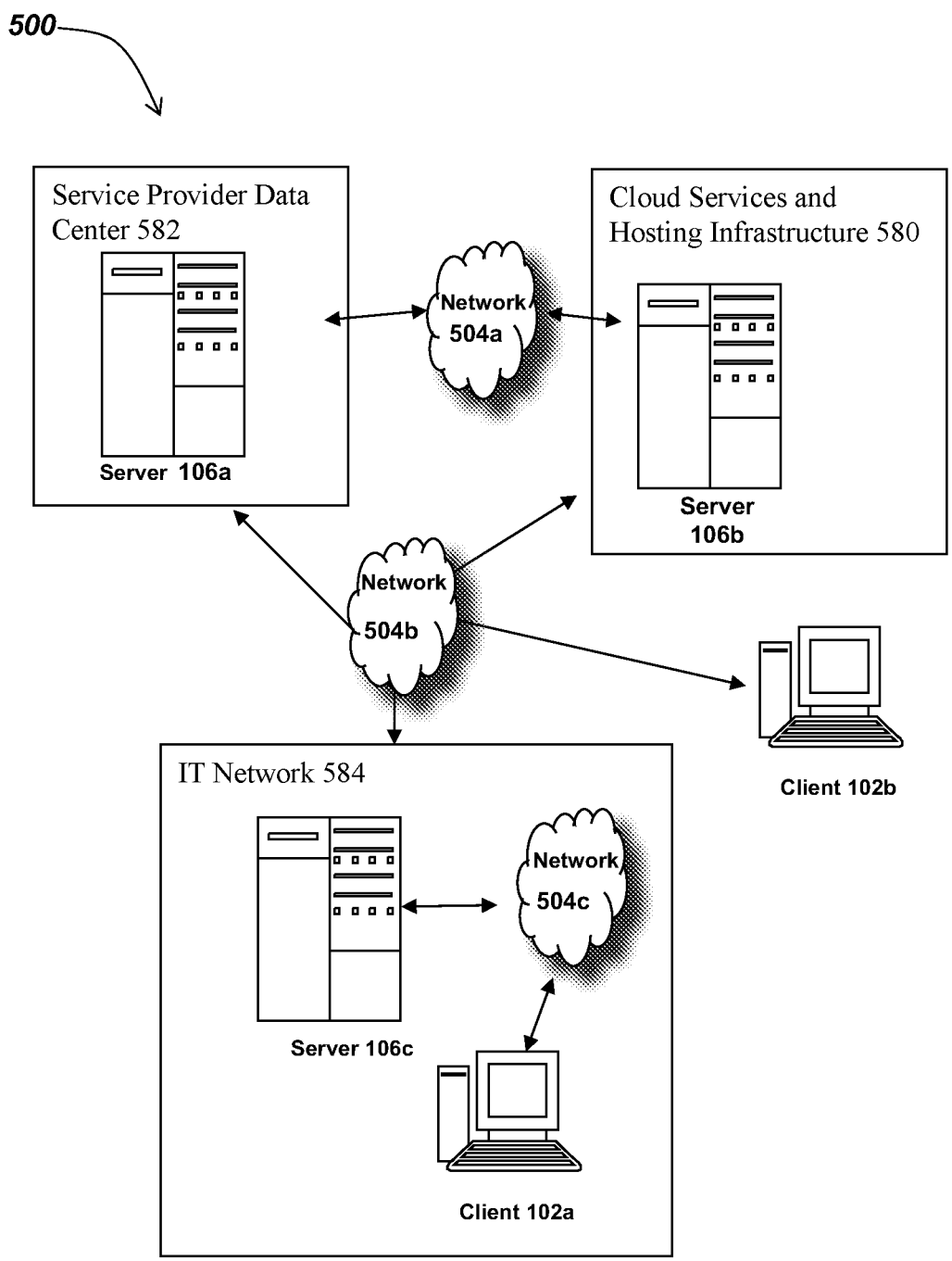

Referring now to FIG. 5D, a block diagram depicts one embodiment of a system in which a plurality of networks provides hosting and delivery services. In brief overview, the system includes a cloud services and hosting infrastructure 580, a service provider data center 582, and an information technology (IT) network 584.

In one embodiment, the data center 582 includes computing devices such as, without limitation, servers (including, for example, application servers, file servers, databases, and backup servers), routers, switches, and telecommunications equipment. In another embodiment, the cloud services and hosting infrastructure 580 provides access to, without limitation, storage systems, databases, application servers, desktop servers, directory services, web servers, as well as services for accessing remotely located hardware and software platforms. In still other embodiments, the cloud services and hosting infrastructure 580 includes a data center 582. In other embodiments, however, the cloud services and hosting infrastructure 580 relies on services provided by a third-party data center 582. In some embodiments, the IT network 504*c* may provide local services, such as mail services and web services. In other embodiments, the IT network 504*c* may provide local versions of remotely located services, such as locally-cached versions of remotely-located print servers, databases, application servers, desktop servers, directory services, and web servers. In further embodiments, additional servers may reside in the cloud services and hosting infrastructure 580, the data center 582, or other networks altogether, such as those provided by third-party service providers including, without limitation, infrastructure service providers, application service providers, platform service providers, tools service providers, and desktop service providers.

In one embodiment, a user of a client 102 accesses services provided by a remotely located server 106*a*. For instance, an administrator of an enterprise IT network 584 may determine that a user of the client iota will access an application executing on a virtual machine executing on a remote server 106*a*. As another example, an individual user of a client 102*b* may use a resource provided to consumers by the remotely located server 106 (such as email, fax, voice or other communications service, data backup services, or other service).

As depicted in FIG. 1D, the data center 582 and the cloud services and hosting infrastructure 580 are remotely located from an individual or organization supported by the data center 582 and the cloud services and hosting infrastructure 580; for example, the data center 582 may reside on a first network 504*a* and the cloud services and hosting infrastructure 580 may reside on a second network 504*b*, while the IT network 584 is a separate, third network 504*c*. In other embodiments, the data center 582 and the cloud services and hosting infrastructure 580 reside on a first network 504*a* and the IT network 584 is a separate, second network 504*c*. In still other embodiments, the cloud services and hosting infrastructure 580 resides on a first network 504*a* while the data center 582 and the IT network 584 form a second network 504*c*. Although FIG. 5D depicts only one sever 106*a*, one server 106*b*, one server 106*c*, two clients 102, and three networks 504, it should be understood that the system may provide multiple ones of any or each of those components. The servers 106, clients 102, and networks 504 may be provided as described above in connection with FIGS. 5A-5C.

Therefore, in some embodiments, an IT infrastructure may extend from a first network—such as a network owned and managed by an individual or an enterprise—into a second network, which may be owned or managed by a separate entity than the entity owning or managing the first network. Resources provided by the second network may be said to be "in a cloud." Cloud-resident elements may include, without limitation, storage devices, servers, databases, computing environments (including virtual machines, servers, and desktops), and applications. For example, the IT network 584 may use a remotely located data center 582 to store servers (including, for example, application servers, file servers, databases, and backup servers), routers, switches, and telecommunications equipment. The data center 582 may be owned and managed by the IT network 584 or a third-party service provider (including for example, a cloud services and hosting infrastructure provider) may provide access to a separate data center 582.

In some embodiments, one or more networks providing computing infrastructure on behalf of customers is referred to a cloud. In one of these embodiments, a system in which users of a first network access at least a second network including a pool of abstracted, scalable, and managed computing resources capable of hosting resources may be referred to as a cloud computing environment. In another of these embodiments, resources may include, without limitation, virtualization technology, data center resources, applications, and management tools. In some embodiments, Internet-based applications (which may be provided via a "software-as-a-service" model) may be referred to as cloud-based resources. In other embodiments, networks that provide users with computing resources, such as remote servers, virtual machines, or blades on blade servers, may be referred to as compute clouds or "infrastructure-as-a-service" providers. In still other embodiments, networks that provide storage resources, such as storage area networks, may be referred to as storage clouds. In further embodiments, a resource may be cached in a local network and stored in a cloud.

In some embodiments, some or all of a plurality of remote machines 106 may be leased or rented from third-party companies such as, by way of example and without limitation, Amazon Web Services LLC of Seattle, Wash.; Rackspace US, Inc. of San Antonio, Tex.; Microsoft Corporation of Redmond, Wash.; and Google Inc. of Mountain View, Calif. In other embodiments, all the hosts 106 are owned and managed by third-party companies including, without limitation, Amazon Web Services LLC, Rackspace US, Inc., Microsoft, and Google.

It should be understood that the systems described above may provide multiple ones of any or each of those components and these components may be provided on either a standalone machine or, in some embodiments, on multiple machines in a distributed system. The phrases 'in one embodiment', 'in another embodiment', and the like, generally mean the particular feature, structure, step, or characteristic following the phrase is included in at least one embodiment of the present disclosure and may be included in more than one embodiment of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip, electronic devices, a computer-readable non-volatile storage unit, non-volatile memory, such as semiconductor memory devices, including EPROM, EEPROM, and flash memory devices; magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data from a second computer providing access to the programs via a network transmission line, wireless transmission media, signals propagating through space, radio waves, infrared signals, etc.

Having described certain embodiments of methods and systems for restricting data access based on properties of at least one of a process and a machine executing the process, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method of secure distribution, in a multi-tenant remote computing environment, of data, the method comprising:

receiving a request for first verification data, from a first client computing device, by a management application on a first of a plurality of multi-tenant computing devices, the management application stored in a protected region of physical memory and executed by a processor in a trusted execution environment in the one of the plurality of multi-tenant computing devices;

transmitting, by the management application, to the first client computing device, first verification data including an enumeration of process attributes for a type of multi-tenant computing device in the plurality of multi-tenant computing devices that the management application trusts;

receiving, by the management application, from the first client computing device, data and information associated with the data;

requesting second verification data, by the management application, from a transactional service executing on a second of the plurality of multi-tenant computing devices, the transactional service stored in an encrypted region of physical memory and executed by a processor in a trusted execution environment in the second of the plurality of multi-tenant computing devices;

requesting, by the management application, from a third-party authentication provider, verification of at least one attribute of the transactional service based upon received second verification data; and transmitting, by the management application, to the transactional service, the received data and information associated with the data, responsive to verification by the third-party verification provider of the at least one attribute of the transactional service.

2. The method of claim 1 further comprising transmitting, by the management application to the first client computing device, first verification data including an identification of an attribute of the trusted execution environment on the first of the plurality of multi-tenant computing devices executing the management application.

3. The method of claim 1 further comprising transmitting, by the management application to the first client computing device, first verification data including an identification of an attribute of the encrypted region of physical memory storing the management application.

4. The method of claim 1 further comprising receiving, by the management application from the transactional service, verification data including an identification of an attribute of the trusted execution environment on the second of the plurality of multi-tenant computing devices executing the management application.

5. The method of claim 1 further comprising receiving, by the management application from the transactional service, verification data including an identification of an attribute of the encrypted region of physical memory storing the transactional service on the second of the plurality of multi-tenant computing devices.

6. The method of claim 1 further comprising:
   requesting third verification data, by the management application, from a second transactional service executing on a third of the plurality of multi-tenant computing devices, the second transactional service stored in an encrypted region of physical memory and executed by a processor in a trusted execution environment in the third of the plurality of multi-tenant computing devices;
   requesting, by the management application, from a third-party verification provider, verification of at least one attribute of the second transactional service based upon the second verification data; and
   transmitting, by the management application, to the second transactional service, the received data and information associated with the data, responsive to verification by the third-party verification provider of the at least one attribute of the second transactional service.

7. The method of claim 6 further comprising receiving, by the management application, from the third of the plurality of multi-tenant computing devices, an indication that the second transactional service is available for providing at least one service to at least one client computing device.

8. The method of claim 7, wherein requesting third verification data further comprises transmitting the request for the third verification data responsive to receiving the indication of availability of the second transactional service.

9. The method of claim 1 further comprising:
   receiving, from a second client computing device, by the transactional service, a request for the data, the request including an identifier of an identity provider in a plurality of identifiers;
   verifying, by the transactional service, that a user of the second client computing device is identified in the received information associated with the data;
   selecting, by the transactional service, the identity provider from the plurality of identity providers, based on the identifier included in the request for the received information associated with the data;
   requesting, by the transactional service, from the selected identity provider, authentication of the user of the second client computing device; and
   sending, by the transactional service, to the second computing device, the data, responsive to the authentication by the selected identity provider of the user of the second client computing device.

10. The method of claim 1 further comprising:
    receiving, from a second client computing device, by the transactional service, a request for the cryptographic data;
    authenticating, by the transactional service, a user of the second client computing device; and
    sending, by the transactional service, to the second client computing device, the data, responsive to the authentication.

11. The method of claim 1 further comprising:
    receiving, from the first client computing device, by the transactional service, a request for the data;
    authenticating, by the transactional service, a user of the first client computing device; and
    sending, by the transactional service, to the first client computing device, the data, responsive to the authentication.

12. The method of claim 1 further comprising executing, by the transactional service, a key management service.

13. The method of claim 1 further comprising executing, by the transactional service, an access control management service.

* * * * *